United States Patent
Lee et al.

(10) Patent No.: US 9,585,045 B2
(45) Date of Patent: Feb. 28, 2017

(54) METHOD AND APPARATUS FOR PERFORMING RADIO LINK MONITORING AND/OR CHANNEL QUALITY INDICATOR MEASUREMENT IN WIRELESS COMMUNICATION SYSTEM

(71) Applicant: LG ELECTRONICS INC., Seoul (KR)

(72) Inventors: Jaewook Lee, Seoul (KR); Youngdae Lee, Seoul (KR); Sunghoon Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 27 days.

(21) Appl. No.: 14/416,575

(22) PCT Filed: Jul. 31, 2013

(86) PCT No.: PCT/KR2013/006899
§ 371 (c)(1),
(2) Date: Jan. 22, 2015

(87) PCT Pub. No.: WO2014/021638
PCT Pub. Date: Feb. 6, 2014

(65) Prior Publication Data
US 2015/0172949 A1    Jun. 18, 2015

Related U.S. Application Data

(60) Provisional application No. 61/678,117, filed on Aug. 1, 2012.

(51) Int. Cl.
*H04W 24/10* (2009.01)
*H04B 17/00* (2015.01)
(Continued)

(52) U.S. Cl.
CPC ............ *H04W 24/10* (2013.01); *H04B 17/00* (2013.01); *H04B 17/309* (2015.01); *H04L 1/20* (2013.01);
(Continued)

(58) Field of Classification Search
CPC .... H04W 24/10; H04W 36/0083; H04L 1/20; H04B 17/309; H04B 17/00; H04B 17/345; H04B 7/0417
See application file for complete search history.

(56) References Cited

U.S. PATENT DOCUMENTS

2011/0158305 A1    6/2011  Goransson
2012/0020231 A1    1/2012  Chen et al.
(Continued)

FOREIGN PATENT DOCUMENTS

WO    2012/057590    5/2012
WO    2012/064093    5/2012

OTHER PUBLICATIONS

PCT International Application No. PCT/KR2013/006899, Written Opinion of the International Searching Authority dated Nov. 15, 2013, 1 page.
Intel Corporation, "RRM/RLM/CQI for in-device coexistence," 3GPP TSG RAN WG2 Meeting #78, R2-122799, May 2012, 2 pages.
Nokia Corporation, et al., "Considerations on allowing ISM interference to LTE downlink," 3GPP TSG-RAN WG2 Meeting #78, R2-122525, May 2012, 4 pages.
(Continued)

*Primary Examiner* — Andrew Lai
*Assistant Examiner* — Chuong M Nguyen
(74) *Attorney, Agent, or Firm* — Lee Hong Degerman Kang & Waimey

(57) ABSTRACT

A method and apparatus for measuring a channel in a wireless communication system is provided. A user equipment (UE) performs radio link monitoring (RLM) measurement and/or channel quality indicator (CQI) measurement according to phases of in-device coexistence (IDC) interference. The RLM measurement does not reflect the IDC (Continued)

interference in phase 2 and 3. The CQI measurement does not reflect the IDC interference in phase 3.

5 Claims, 12 Drawing Sheets

(51) Int. Cl.
 - *H04B 17/309* (2015.01)
 - *H04L 1/20* (2006.01)
 - *H04B 7/04* (2006.01)
 - *H04B 17/345* (2015.01)
 - *H04W 36/00* (2009.01)

(52) U.S. Cl.
 CPC .......... *H04B 7/0417* (2013.01); *H04B 17/345* (2015.01); *H04W 36/0083* (2013.01)

(56) References Cited

U.S. PATENT DOCUMENTS

| | | | |
|---|---|---|---|
| 2012/0040620 A1 | 2/2012 | Fu et al. | |
| 2012/0115529 A1* | 5/2012 | Sun | H04W 24/10 455/517 |
| 2012/0164948 A1* | 6/2012 | Narasimha | H04W 72/1215 455/63.1 |
| 2012/0281563 A1* | 11/2012 | Comsa | H04W 24/10 370/252 |

OTHER PUBLICATIONS

Pantech, "Measurement on in-device coexistence circumstances," 3GPP TSG-RAN WG2 Meeting #75bis, R2-115187, Oct. 2011, 4 pages.

European Patent Office Application Serial No. 13826020.3, Search Report dated Dec. 16, 2015, 11 pages.

* cited by examiner

METHOD AND APPARATUS FOR PERFORMING RADIO LINK MONITORING AND/OR CHANNEL QUALITY INDICATOR MEASUREMENT IN WIRELESS COMMUNICATION SYSTEM

CROSS-REFERENCE TO RELATED APPLICATIONS

This application is the National Stage filing under 35 U.S.C. 371 of International Application No. PCT/KR2013/006899, filed on Jul. 31, 2013, which claims the benefit of U.S. Provisional Application Ser. No. 61/678,117, filed on Aug. 1, 2012, the contents of which are all hereby incorporated by reference herein in their entirety.

BACKGROUND OF THE INVENTION

Field of the Invention

The present invention relates to wireless communications, and more particularly, to a method and apparatus for performing radio link monitoring and/or channel quality indicator measurement in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

In order to allow users to access various networks and services ubiquitously, an increasing number of user equipments (UEs) are equipped with multiple radio transceivers. For example, a UE may be equipped with LTE, Wi-Fi, Bluetooth (BT) transceivers, etc, for a wireless communication system, and global navigation satellite system (GNSS) receivers. For example, a UE may be equipped with a LTE module and a Bluetooth module in order to receive a voice over Internet (VoIP) service, multimedia service using a Bluetooth earphone. A UE may be equipped with a LTE module and a Wi-Fi module in order to distribute traffics. A UE may be equipped with a LTE module and a GNSS module in order to acquire location information additionally.

Due to extreme proximity of multiple radio transceivers within the same UE, the transmit power of one transmitter may be much higher than the received power level of another receiver. By means of filter technologies and sufficient frequency separation, the transmit signal may not result in significant interference. But for some coexistence scenarios, e.g. different radio technologies within the same UE operating on adjacent frequencies or sub-harmonic frequencies, the interference power coming from a transmitter of the collocated radio may be much higher than the actual received power level of the desired signal for a receiver. This situation causes in-device coexistence (IDC) interference. The challenge lies in avoiding or minimizing IDC interference between those collocated radio transceivers, as current state-of-the-art filter technology might not provide sufficient rejection for certain scenarios. Therefore, solving the interference problem by single generic radio frequency (RF) design may not always be possible and alternative methods needs to be considered.

Meanwhile, a UE may persistently perform measurement in order to maintain link quality with a serving cell. Specifically, the UE may persistently perform monitoring of link quality in order to determine whether communication with the serving cell is available or not. In 3GPP LTE, it is called radio link monitoring (RLM). If link quality of the serving cell is bad enough that communication with the serving cell is not available, the UE may declare a radio link failure. IF the UE declares the radio link failure, the UE may abandon maintaining communication with the serving cell, and may select a cell by a cell selection procedure. The UE may try to an RRC connection reestablishment with the selected cell.

Whether to reflect IDC interference for RLM and/or channel quality indicator (CQI) measurement is not defined yet. Accordingly, a method for performing RLM and/or CQI measurement considering IDC interference may be required.

SUMMARY OF THE INVENTION

The present invention provides a method for performing radio link monitoring (RLM) and/or channel quality indicator (CQI) measurement in a wireless communication system. The present invention provides a method for measuring a channel according to interference situation in order to determine radio link quality correctly, when a user equipment (UE) experiences in-device coexistence (IDC) interference by long-term evolution (LTE) transceiver and other multiple radio transceivers, which operate on adjacent frequencies at the same time. The present invention provides a method for measuring a channel based on a phase according to interference situation.

In an aspect, a method for measuring, by a user equipment (UE), a channel in a wireless communication system is provided. The method includes performing a first radio link monitoring (RLM) measurement, transmitting an indication to a network, and after transmitting the indication, performing a second RLM measurement. The second RLM measurement excludes interference.

The indication may be an in-device coexistence (IDC) indication.

The interference may be IDC interference between a first system and a second system, which coexist in the UE.

The second RLM measurement may exclude measurement results affected by the interference.

The second RLM measurement may be performed excluding subframes affected by the interference.

The method may further include receiving a configuration from the network, and after receiving the configuration, performing a third RLM measurement. The third RLM measurement may exclude the interference.

The third RLM measurement may exclude measurement results affected by the interference.

The third RLM measurement may be performed excluding subframes affected by the interference.

The configuration may be a discontinuous reception (DRX) configuration.

The RLM measurement may be monitoring downlink link quality based on a cell-specific reference signal in order to detect the downlink link quality.

In another aspect, a method for measuring, by a user equipment (UE), a channel in a wireless communication system is provided. The method includes transmitting a first channel quality indicator (CQI) to a network, transmitting an indication to the network, transmitting a second CQI to the network, receiving a configuration from the network, and transmitting a third CQI. The third CQI excludes interference.

The third CQI may exclude measurement results affected by the interference.

The third CQI may be measured excluding subframes affected by the interference.

An unnecessary radio link failure can be prevented, and the UE can receive data stably.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
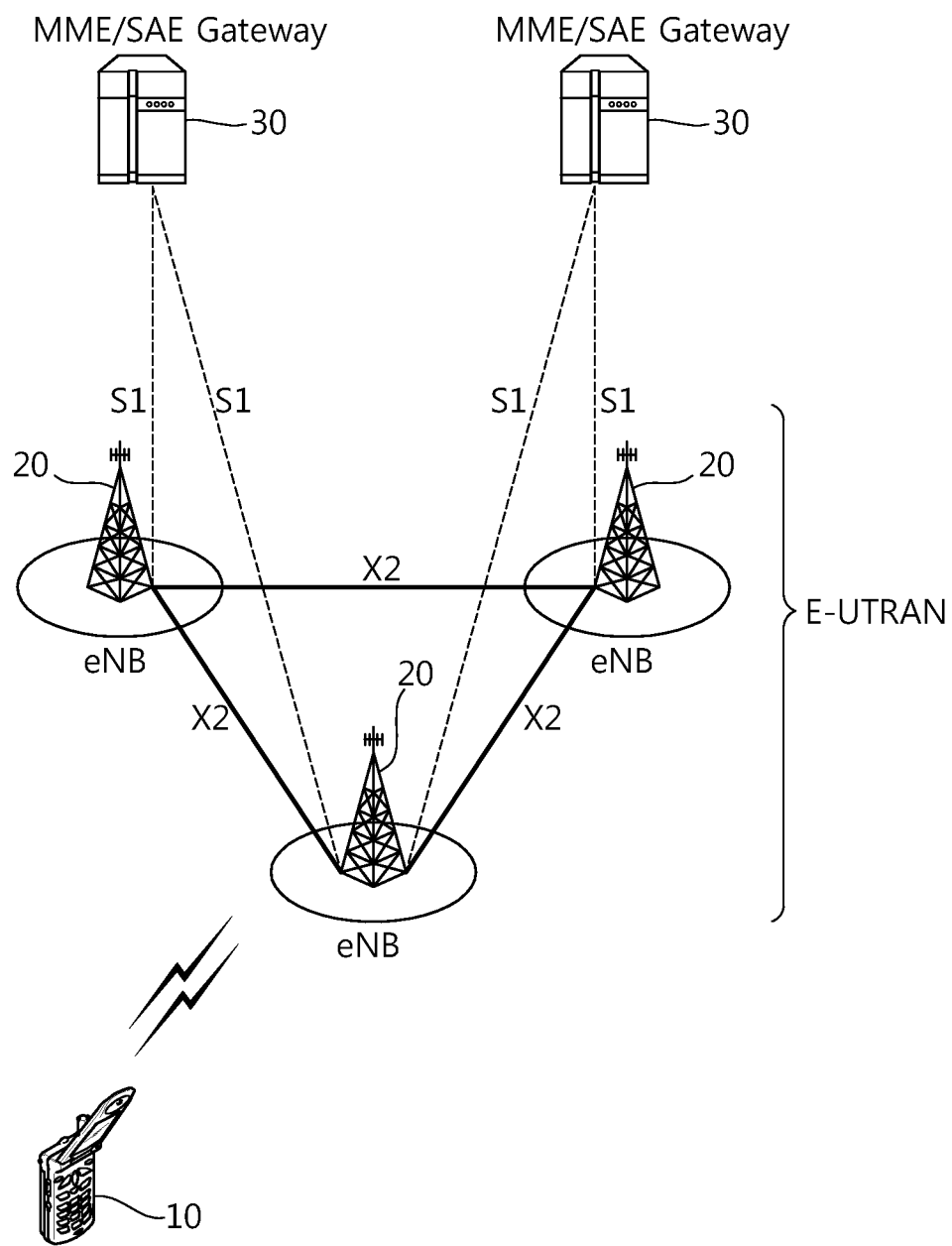
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
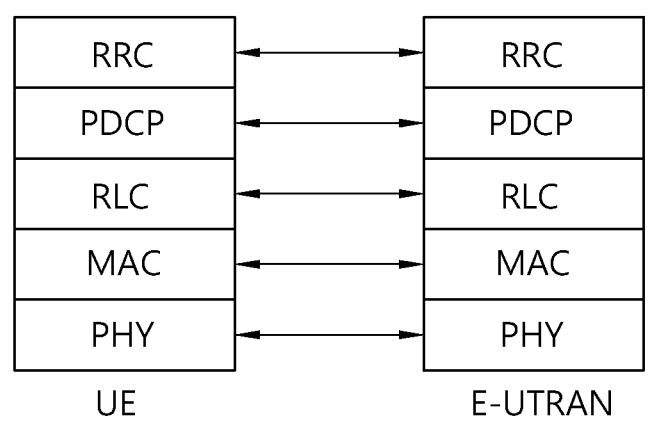
FIG. 2 is a diagram showing radio interface protocol architecture for a control plane.
Figure 3:
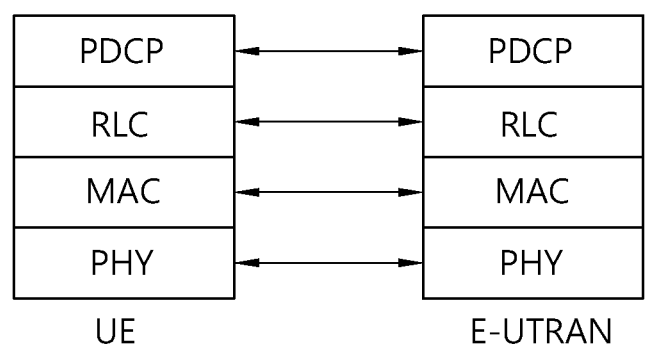
FIG. 3 is a diagram showing radio interface protocol architecture for a user plane.

FIG. 2 is a diagram showing radio interface protocol architecture for a control plane. FIG. 3 is a diagram showing radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
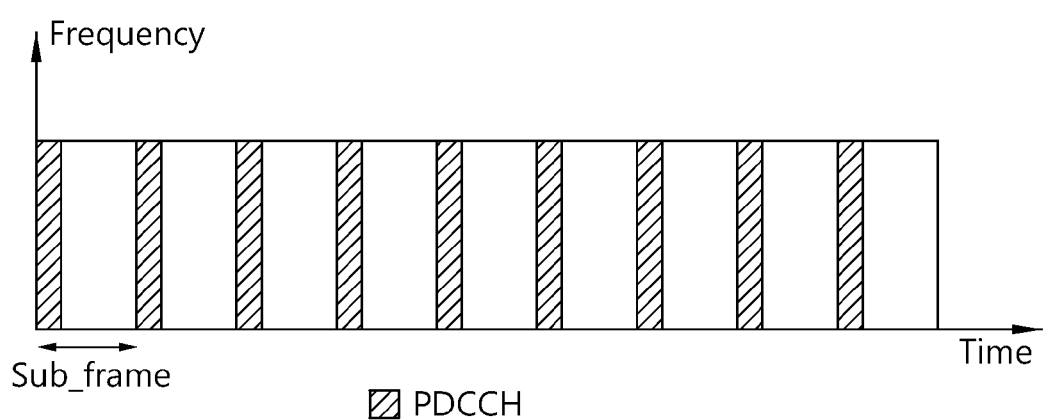
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

An RRC state indicates whether an RRC of a user equipment (UE) is logically connected to an RRC of an E-UTRAN. When an RRC connection is established between an RRC layer of the UE and an RRC layer of the E-UTRAN, the UE is in an RRC connected state (RRC_CONNECTED), and otherwise the UE is in an RRC idle state (RRC_IDLE). Since the UE in the RRC_CONNECTED has the RRC connection established with the E-UTRAN, the E-UTRAN can recognize the existence of the UE in the RRC_CONNECTED and can effectively control the UE. Meanwhile, the UE in the RRC_IDLE cannot be recognized by the E-UTRAN, and a core network (CN) manages the UE in unit of a tracking area (TA) which is a larger area than a cell. That is, only the existence of the UE in the RRC_IDLE is recognized in unit of a large area, and the UE must transition to the RRC_CONNECTED to receive a typical mobile communication service such as voice or data communication.

When the user initially powers on the UE, the UE first searches for a proper cell and then remains in the RRC_IDLE in the cell. When there is a need to establish an RRC connection, the UE which remains in the RRC_IDLE may establish the RRC connection with the RRC of the E-UTRAN through an RRC connection procedure and then may transition to the RRC_CONNECTED. The UE which remains in the RRC_IDLE may need to establish the RRC connection with the E-UTRAN when uplink data transmission is necessary due to a user's call attempt or the like or when there is a need to transmit a response message upon receiving a paging message from the E-UTRAN.

The UE which remains in the RRC_IDLE can persistently perform cell reselection to find a better cell. In this case, the UE can perform measurement and cell reselection by using frequency priority information. That is, the UE can determine which frequency will be preferentially considered when performing frequency measurement and cell reselection on the basis of the frequency priority information. The UE can receive the frequency priority information by using system information or an RRC connection release message, or can receive the frequency priority information from another radio access technology (RAT) in inter-RAT cell reselection.

Hereinafter, measuring and measurement reporting will be described.

It is necessary to support mobility of a UE in a mobile communication system. Therefore, the UE can persistently measure quality of a serving cell which currently provides a service and quality of a neighbor cell. The UE can report a measurement result to a network at a proper time, and the network can provide optimal mobility to the UE by using a handover or the like. For this, a base station can configure information regarding the measuring and the measurement reporting to the UE. The information regarding the measuring and measurement reporting may include a measurement object, a reporting configuration, a measurement identity, a quantity configuration, a measurement gap, etc.

Measurement object: It indicates a target for which the UE performs measurement. The target for which the UE performs measurement can be classified into three types, i.e., intra-frequency measurement for a cell having a center frequency equal to that of a serving cell, inter-frequency measurement for a cell having a center frequency different from that of the serving cell, and inter-RAT measurement for a heterogeneous network. The heterogeneous network may include a GSM/EDGE radio access network (GERAN) and a UMTS terrestrial radio access network (UTRAN) conforming to a 3GPP standard specification and a CDMA 2000 system conforming to a 3GPP2 standard specification.
  Reporting configuration: It includes a reporting criterion indicating a criterion for performing measurement reporting and a reporting format indicating the content included in the measurement reporting. The reporting criterion can be classified into an event-based trigger type and a periodical-based trigger type. In the event-based trigger type, the measurement reporting is performed when a predetermined specific condition is satisfied. In the periodical-based trigger type, when the UE acquires information desired by the eNB, the information is first reported to the eNB, and thereafter reporting is performed whenever a specific time elapses. The event-based trigger type may include various events such as A1 (a case where the quality of the serving cell is better than a threshold), A2 (a case where the quality of the serving cell is worse than the threshold), A3 (a case where the quality of the neighbor cell is better than that of a PCell by an offset), A4 (a case where the quality of the neighbor cell is better than the threshold), A5 (a case where the quality of the PCell is worse than a threshold 1 and the quality of the neighbor cell is better than a threshold 2), A6 (a case where the quality of the neighbor cell is better than that of an SCell by the offset), B1 (a case where the quality of an inter-RAT neighbor cell is better than the threshold), B2 (a case where the quality of the PCell is worse than the threshold 1 and the quality of the inter-RAT neighbor cell is better than the threshold 2), etc.
  Measurement identity: It indicates a linkage which links a measurement object and a reporting configuration.
  Quantity configuration: It indicates information on filtering performed for the measurement result of the UE.
  Measurement gap: It indicates a duration in which the UE is allowed to perform measurement. UL and DL data transmissions are not achieved in the measurement gap.

Figure 5:
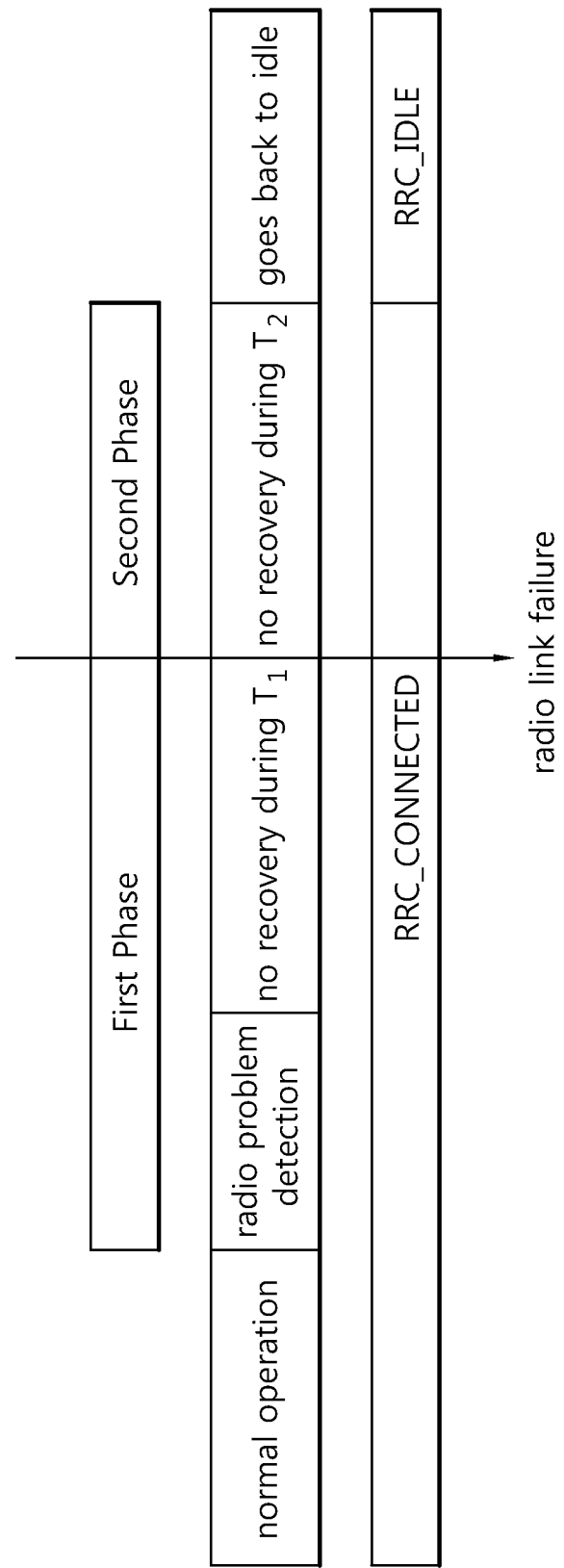
FIG. 5 shows a radio link monitoring and radio link failure procedure.

FIG. 5 shows a radio link monitoring and radio link failure procedure.

It is assumed that a UE is in the RRC_CONNECTED, and performs a normal operation. At a first phase, the UE detect whether there is currently a problem with a radio link. If there is a problem with the radio link, the UE declares a radio link problem, and waits for recovering of the radio link during a certain time, i.e. T1. If the radio link is not recovered during the time T1 at the first phase, the UE declares a radio link failure, and enters a second phase. At the second phase, the UE performs an RRC connection reestablishment procedure during time T2 in order to recover the radio link from the radio link failure. If the radio link is not recovered during the time T2 at the second phase, the UE may go back to the RRC_IDLE.

Radio link monitoring (RLM) is described below in detail. It may be referred to Section 7.6 of 3GPP TS 36.133 V10.0.0 (October 2010).

The UE shall monitor the downlink link quality based on the cell-specific reference signal in order to detect the downlink radio link quality of the primary cell (PCell).

The UE shall estimate the downlink radio link quality and compare it to the thresholds $Q_{out}$ and $Q_{in}$ for the purpose of monitoring downlink radio link quality of the PCell.

The threshold $Q_{out}$ is defined as the level at which the downlink radio link cannot be reliably received and shall correspond to 10% block error rate of a hypothetical PDCCH transmission taking into account the physical control format indicator channel (PCFICH) errors with transmission parameters specified in Table 1.

TABLE 1

| Attribute | Value |
| --- | --- |
| DCI format | 1A |
| Number of control OFDM symbols | 2; Bandwidth ≥10 MHz<br>3; [3] MHz ≤ Bandwidth ≤ 5 MHz<br>4; Bandwidth = 1.4 MHz |
| Aggregation level (CCE) | 4; Bandwidth = 1.4 MHz<br>8; Bandwidth ≥3 MHz |
| Ratio of PDCCH RE energy to average RS RE energy | 4 dB; when single antenna port is used for cell-specific reference signal transmission by the PCell.<br>1 dB: when two or four antenna ports are used for cell-specific reference signal transmission by the PCell. |
| Ratio of PCFICH RE energy to average RS RE energy | 4 dB; when single antenna port is used for cell-specific reference signal transmission by the PCell.<br>1 dB: when two or four antenna ports are used for cell-specific reference signal transmission by the PCell. |

The threshold $Q_{in}$ is defined as the level at which the downlink radio link quality can be significantly more reliably received than at $Q_{out}$ and shall correspond to 2% block error rate of a hypothetical PDCCH transmission taking into account the PCFICH errors with transmission parameters specified in Table 2.

TABLE 2

| Attribute | Value |
| --- | --- |
| DCI format | 1C |
| Number of control OFDM symbols | 2; Bandwidth ≥10 MHz<br>3; 3 MHz ≤ Bandwidth ≤ 5 MHz<br>4; Bandwidth = 1.4 MHz |
| Aggregation level (CCE) | 4 |

TABLE 2-continued

| Attribute | Value |
|---|---|
| Ratio of PDCCH RE energy to average RS RE energy | 0 dB; when single antenna port is used for cell-specific reference signal transmission by the PCell.<br>−3 dB; when two or four antenna ports are used for cell-specific reference signal transmission by the PCell. |
| Ratio of PCFICH RE energy to average RS RE energy | 4 dB; when single antenna port is used for cell-specific reference signal transmission by the PCell.<br>1 dB: when two or four antenna ports are used for cell-specific reference signal transmission by the PCell. |

Requirements for RLM are described.

Minimum requirement when no discontinuous reception (DRX) is used is described. When the downlink radio link quality of the PCell estimated over the last 200 ms period becomes worse than the threshold $Q_{out}$, layer 1 of the UE shall send an out-of-sync indication for the PCell to the higher layers within 200 ms $Q_{out}$ evaluation period. A layer 3 filter shall be applied to the out-of-sync indications.

When the downlink radio link quality of the PCell estimated over the last 100 ms period becomes better than the threshold $Q_{in}$, layer 1 of the UE shall send an in-sync indication for the PCell to the higher layers within 100 ms $Q_{in}$ evaluation period. A layer 3 filter shall be applied to the in-sync indications.

The transmitter power of the UE shall be turned off within 40 ms after expiry of T310 timer.

Minimum requirement when DRX is used is described. When DRX is used the $Q_{out}$ evaluation period ($T_{Evaluate\_Q_{out\_DRX}}$) and the $Q_{in}$ evaluation period ($T_{Evaluate\_Q_{in\_DRX}}$) is specified in Table 3 will be used.

TABLE 3

| DRX cycle length (s) | $T_{Evaluate\_Q_{out\_DRX}}$ and $T_{Evaluate\_Q_{in\_DRX}}$ (s) (DRX cycles) |
|---|---|
| ≤0.01 | Non-DRX requirements in section 7.6.2.1 are applicable. |
| 0.01 < DRX cycle ≤ 0.04 | Note (20) |
| 0.04 < DRX cycle ≤ 0.64 | Note (10) |
| 0.64 < DRX cycle ≤ 2.56 | Note (5) |

Note:
Evaluation period length in time depends on the length of the DRX cycle in use When the downlink radio link quality of the PCell estimated over the last $T_{Evaluate\_Q_{out\_DRX}}$ [s] period becomes worse than the threshold $Q_{out}$, layer 1 of the UE shall send out-of-sync indication for the PCell to the higher layers within $T_{Evaluate\_Q_{out\_DRX}}$ [s] evaluation period. A layer 3 filter shall be applied to the out-of-sync indications.

When the downlink radio link quality of the PCell estimated over the last $T_{Evaluate\_Q_{in\_DRX}}$[s] period becomes better than the threshold $Q_{in}$, layer 1 of the UE shall send in-sync indications for the PCell to the higher layers within $T_{Evaluate\_Q_{in\_DRX}}$[s] evaluation period. A layer 3 filter shall be applied to the in-sync indications.

Upon start of T310 timer, the UE shall monitor the link for recovery using the evaluation period and layer 1 indication interval corresponding to the non-DRX mode until the expiry or stop of T310 timer.

The transmitter power of the UE shall be turned off within 40 ms after expiry of T310 timer.

Minimum requirement at transitions is described. The out-of-sync and in-sync evaluations of the PCell shall be performed. Two successive indications from layer 1 shall be separated by at least max (10 ms, DRX_cycle_length).

When the UE transitions between DRX and non-DRX or when DRX cycle periodicity changes, for a duration of time equal to the evaluation period corresponding to the second mode after the transition occurs, the UE shall use an evaluation period that is no less than the minimum of evaluation periods corresponding to the first mode and the second mode. Subsequent to this duration, the UE shall use an evaluation period corresponding to the second mode. This requirement shall be applied to both out-of-sync evaluation and in-sync evaluation of the PCell.

Channel quality indicator (CQI) is described below in detail. It may be referred to Section 7.2.3 of 3GPP TS 36.213 V10.0.0 (December 2010).

The CQI indices and their interpretations are given in Table 4.

TABLE 4

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Based on an unrestricted observation interval in time and frequency, the UE shall derive for each CQI value reported in uplink subframe n the highest CQI index between 1 and 15 in Table 4 which satisfies the following condition, or CQI index 0 if CQI index 1 does not satisfy the condition:

A single PDSCH transport block with a combination of modulation scheme and transport block size corresponding to the CQI index, and occupying a group of downlink physical resource blocks termed the channel state information (CSI) reference resource, could be received with a transport block error probability not exceeding 0.1.

If CSI subframe sets $C_{CSI,0}$ and $C_{CSI,1}$ are configured by higher layers, each CSI reference resource belongs to either $C_{CSI,0}$ or $C_{CSI,1}$ but not to both. When CSI subframe sets $C_{CSI,0}$ and $C_{CSI,1}$ are configured by higher layers, a UE is not expected to receive a trigger for which the CSI reference resource is in subframe that does not belong to either subframe set.

For a UE in transmission mode 9 when parameter pmi-RI-Report is configured by higher layers, the UE shall derive the channel measurements for computing the CQI value reported in uplink subframe n based on only the CSI reference signals. For a UE in transmission mode 9 when the parameter pmi-RI-Report is not configured by higher layers or in other transmission modes, the UE shall derive the channel measurements for computing CQI based on CRS.

A combination of modulation scheme and transport block size corresponds to a CQI index if:
the combination could be signaled for transmission on the PDSCH in the CSI reference resource according to the relevant transport block size table, and the modulation scheme is indicated by the CQI index, and the combination of transport block size and modulation scheme when applied to the reference resource results in the effective channel code rate which is the closest possible to the code rate indicated by the CQI index. If more than one combination of transport block size and modulation scheme results in an effective channel code rate equally close to the code rate indicated by the CQI index, only the combination with the smallest of such transport block sizes is relevant.

The CSI reference resource is defined as follows:

In the frequency domain, the CSI reference resource is defined by the group of downlink physical resource blocks corresponding to the band to which the derived CQI value relates.

In the layer domain, the CSI reference resource is defined by any rank indicator (RI) and precoding matrix indicator (PMI) on which the CQI is conditioned.

In the time domain, the CSI reference resource is defined by a single downlink subframe $n-n_{CQI\_ref}$, where for periodic CSI reporting $n_{CQI\_ref}$ is the smallest value greater than or equal to 4, such that it corresponds to a valid downlink subframe;

where for aperiodic CSI reporting $n_{CQI\_ref}$ is such that the reference resource is in the same valid downlink subframe as the corresponding CSI request in an uplink DCI format.

where for aperiodic CSI reporting $n_{CQI\_ref}$ is equal to 4 and downlink subframe $n-n_{CQI\_ref}$ corresponds to a valid downlink subframe, where downlink subframe $n-n_{CQI\_ref}$ is received after the subframe with the corresponding CSI request in a random access response grant.

A downlink subframe shall be considered to be valid if:
it is configured as a downlink subframe for that UE, and
except for transmission mode 9, it is not a multicast-broadcast single frequency network (MBSFN) subframe, and
it does not contain a downlink pilot slot (DwPTS) field in case the length of DwPTS is $7680*T_s$ and less, and
it does not fall within a configured measurement gap for that UE, and
for periodic CSI reporting, it is an element of the CSI subframe set linked to the periodic CSI report when that UE is configured with CSI subframe sets.

If there is no valid downlink subframe for the CSI reference resource, CSI reporting is omitted in uplink subframe n.

In the CSI reference resource, the UE shall assume the following for the purpose of deriving the CQI index:
The first 3 OFDM symbols are occupied by control signaling
No resource elements used by primary or secondary synchronization signals or physical broadcast channel (PBCH)
CP length of the non-MBSFN subframes
Redundancy version 0
For transmission mode 9 CSI reporting, if UE is configured for PMI/RI reporting, assume DMRS overhead is consistent with most recent reported rank
Assume no REs allocated for CSI-RS and zero-power CSI-RS
Assume no REs allocated for PRS
The PDSCH transmission scheme given by Table 5 depending on the transmission mode currently configured for the UE.

TABLE 5

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |
| 8 | If the UE is configured without PMI/RI reporting: if the number of PBCH antenna ports is one, single-antenna port, port 0; otherwise transmit diversity<br>If the UE is configured with PMI/RI reporting: closed-loop spatial multiplexing |
| 9 | If the UE is configured without PMI/RI reporting: if the number of PBCH antenna ports is one, single-antenna port, port 0; otherwise transmit diversity<br>Closed-loop spatial multiplexing with up to 8 layer transmission, ports 7-14 (see subclause 7.1.5B) |

In-device coexistence (IDC) is described below. It may be referred to Section 23.4 of 3GPP TS 36.300 V11.2.0 (June 2012).

Figure 6:
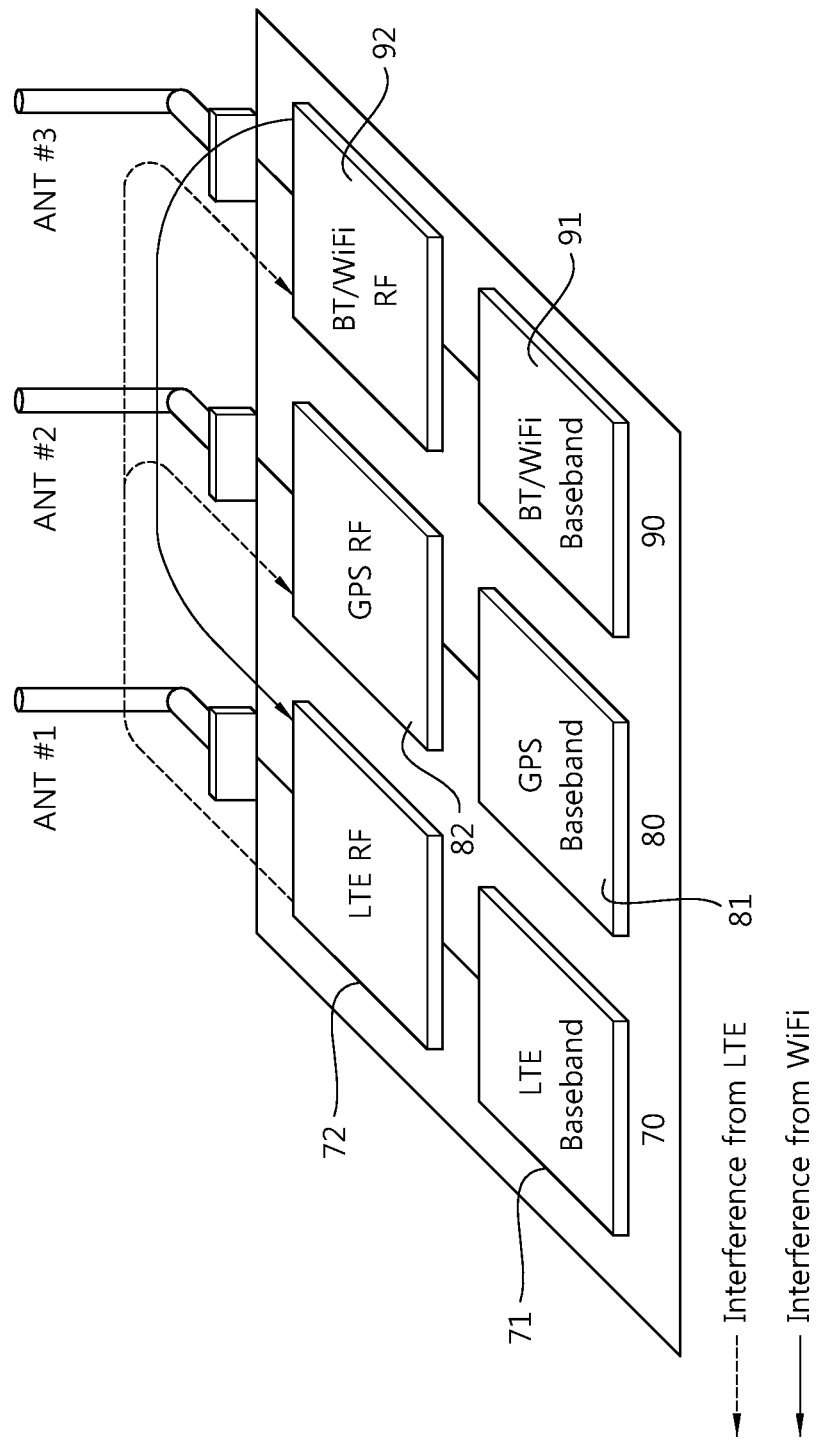
FIG. 6 shows an example of IDC interference within a UE.

FIG. 6 shows an example of IDC interference within a UE.

A LTE module 70 includes a LTE baseband 71 and a LTE RF 72. A global positioning system (GPS) module 80 includes a GPS baseband 81 and a GPS RF 82. A Bluetooth (BT)/Wi-Fi module 90 includes a BT/Wi-Fi baseband 91 and a BT/Wi-Fi RF 92. For example, if all of the LTE module 70, the GPS module 80 and the BT/Wi-Fi module 90 are switched on, the LTE module 70 may interfere the GPS module 80 and the BT/Wi-Fi module 90. Or the BT/Wi-Fi module 90 may interfere the LTE module 70.

Coexistence interference scenarios between LTE radio and other radio technologies are described. 3GPP frequency bands around 2.4 GHz industrial, scientific and medical (ISM) bands are considered.

Figure 7:
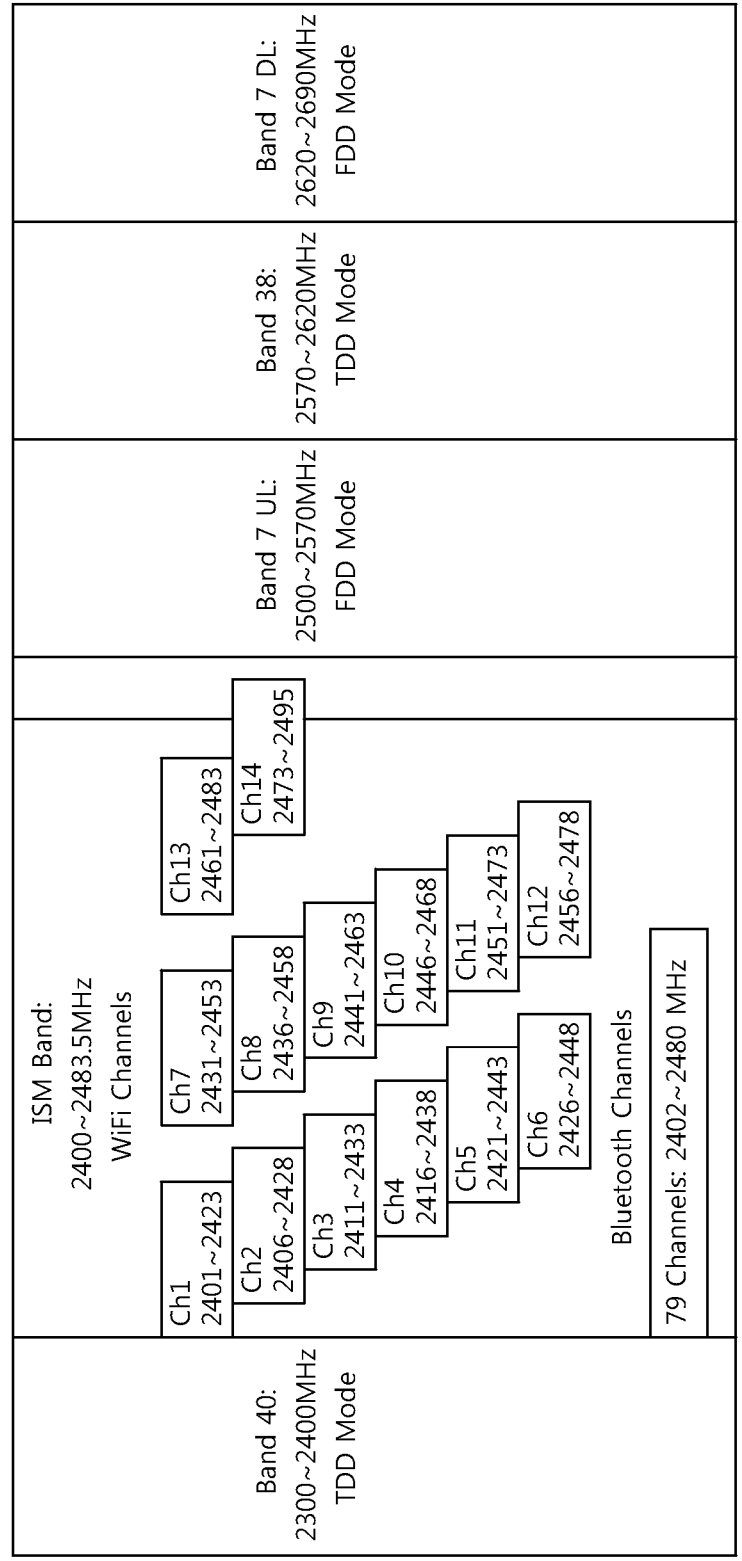
FIG. 7 shows 3GPP frequency bands around ISM band.

FIG. 7 shows 3GPP frequency bands around ISM band.

There are 14 channels demarcated in ISM band for Wi-Fi operation. Each channel has 5 MHz separation from other channel with an exception of channel number 14 where separation is 12 MHz. Channel 1 starts with 2401 MHz and channel 14 ends at 2495 MHz. Different countries have different policies for number of allowed channels of Wi-Fi. The transmitter of LTE band 40 may affect receiver of Wi-Fi and vice-versa. Since band 7 is a FDD band, so there is no impact on the LTE receiver from the Wi-Fi transmitter. But the Wi-Fi receiver will be affected by the LTE uplink transmitter.

Bluetooth operates in 79 channels of 1 MHz each in ISM band. The first channel starts with 2402 MHz and the last channel ends at 2480 MHz. Similar as Wi-Fi case, the activities of LTE band 40 and Bluetooth may disturb each other, and the transmission of LTE band 7 UL may affect Bluetooth reception as well.

Three modes are considered to avoid interference according to whether there is coordination between a LTE module and other coexisting radio modules or not and whether there is coordination between the LTE module and a base station or not in order to solve the IDC interference. At first, in an uncoordinated mode, different radio technologies within the same UE operate independently without any internal coordination between each other. The LTE module and the network do not have any coordination between each other, either. In this case, the LTE module cannot handle appropriately deterioration of service quality due to the IDC interference as the LTE module does not know information on other coexisting radio modules. Secondly, in a UE-coordinated mode, there is an internal coordination between the different radio technologies within the same UE, which means that at least the activities of one radio is known by other radio. Each radio module can know on/off status and/or traffic transmission status of other radio modules within the same UE. However, the network is not aware of the coexistence issue possibly experienced by the UE and is therefore not involved in the coordination. Third, in a network-coordinated mode, different radio technologies within the UE are aware of possible coexistence problems and the UE can inform the network about such problems. It is then mainly up to the network to decide how to avoid coexistence interference.

The LTE module can measure the IDC interference by cooperating with other radio modules or by inter/intra frequency measurements.

When a UE experiences a level of IDC interference that cannot be solved by the UE itself and a network intervention is required, the UE sends an IDC indication via dedicated RRC signalling to report the problems. The details of the IDC indication trigger are left up to UE implementation: it may rely on existing LTE measurements and/or UE internal coordination. The IDC indication should be triggered based on ongoing IDC interference on the serving or non-serving frequencies, instead of assumptions or predictions of potential interference. A UE that supports IDC functionality indicates this capability to the network, and the network can then configure by dedicated signalling whether the UE is allowed to send an IDC indication. The UE may only send an IDC indication for E-UTRA UL/DL carriers for which a Measurement Object is configured.

When notified of IDC problems through an IDC indication from the UE, the eNB can choose to apply a frequency division multiplexing (FDM) solution or a time division multiplexing (TDM) solution:

The basic concept of an FDM solution is to move the LTE signal away from the ISM band by performing inter-frequency handover within E-UTRAN.

The basic concept of a TDM solution is to ensure that transmission of a radio signal does not coincide with reception of another radio signal. LTE DRX mechanism is considered as a baseline to provide TDM patterns (i.e. periods during which the LTE UE may be scheduled or is not scheduled) to resolve the IDC issues. DRX based TDM solution should be used in a predictable way, i.e. the eNB should ensure a predictable pattern of unscheduled periods by means of DRX mechanism.

Figure 8:
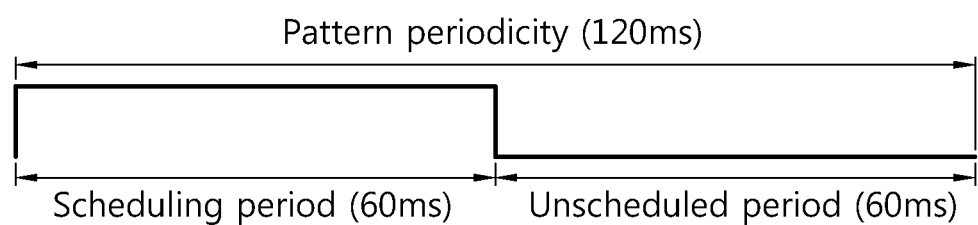
FIG. 8 shows an example of a TDM pattern according to a TDM solution.

FIG. 8 shows an example of a TDM pattern according to a TDM solution.

Referring to FIG. 8, a periodicity of a TDM pattern is 120 ms. A LTE module performs transmission or reception using only a scheduling period having a length of 60 ms. Another coexisting module performs transmission or reception using only an unscheduled period having a length of 60 ms.

To assist the eNB in selecting an appropriate solution, all necessary/available assistance information for both FDM and TDM solutions is sent together in the IDC indication to the eNB. The IDC assistance information contains the list of E-UTRA carriers suffering from ongoing interference and, depending on the scenario, it also contains TDM patterns or parameters to enable appropriate DRX configuration for TDM solutions on the serving E-UTRA carrier. The IDC indication is also used to update the IDC assistance information, including for the cases when the UE no longer suffers from IDC interference. A prohibit mechanism is used to restrict the interval at which the UE sends the IDC indication. In case of inter-eNB handover, the IDC assistance information is transferred from the source eNB to the target eNB.

From the start of IDC interference detection to the delivery of the corresponding IDC indication to the network, it is up to the UE whether RRM measurements reflect IDC interference. After the successful transmission of the IDC indication though, the UE shall ensure that RRM measurements are free of IDC interference.

In addition, the UE can autonomously deny LTE transmission to protect ISM in rare cases if other solutions cannot be used. Conversely, it is assumed that the UE also autonomously denies ISM transmission in order to ensure connectivity with the eNB to perform necessary procedures to resolve IDC problems.

Figure 9:
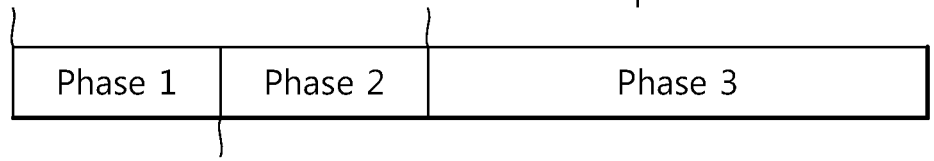
FIG. 9 shows phases according to an IDC interference situation.

FIG. 9 shows phases according to an IDC interference situation.

Referring to FIG. 9, a phase 1 starts when a UE detects start of IDC interference, and ends when the UE transmits an IDC indication to an eNB in order to inform the eNB of the IDC interference. A phase 2 starts when the UE transmits the IDC indication to the eNB, and ends when the UE receives solutions that solved the IDC interference. After the UE is provided the solutions for the IDC interference from the eNB, a phase 3 starts.

Depending on the time from the switch-on of the coexisting radio module, the interference level is different. It is generally assumed that the IDC interference of the phase 1 is less severe than that of the phase 2, and there is no interference issue during LTE scheduling period in the phase 3. Depending on the interference level and the purpose of RLM/CQI measurement, how to perform the RLM/CQI measurement can be different in each phase.

In each phase described in FIG. 9, RLM measurement may be influenced by the IDC interference. The UE may determine that a radio link has a problem due to the IDC interference even though quality of the radio link between the UE and the eNB is good. However, since the interference level is assumed to be low in the phase 1, it seems to be possible for the UE to have a stable radio link even the RLM measurement samples are influenced by the RLM interference. Thus, it is not necessary to force the UE to measure only in non-influenced subframes.

On the other hand, the phase 2 is a transient state so that the UE needs to have a stable radio link between the serving eNB even under the severe IDC interference until this IDC interference will be resolved soon in the phase 3 by FDM/TDM solutions. Unless this is not guaranteed, in other words, if RLM measurement samples are influenced by the IDC interference, it is probable for the UE to have a radio link failure and to perform an RRC connection reestablishment procedure in this phase due to the IDC interference before receiving FDM/TDM solutions for the IDC interference, even though the UE have to wait for receiving FDM/TDM solutions from the eNB. This leads to severe QoS degradation. Hence, the UE needs to ensure that RLM measurements are not influenced by the IDC interference in the phase 2.

In the phase 3, when TDM solution is applied to solve the IDC interference, since it is generally assumed that there is no IDC interference during a scheduling period, the RLM measurement samples taken over the scheduling period will not reflect the IDC interference, and data transmissions are performed only in the scheduling period. However, samples taken over an unscheduled period may be influenced by the IDC interference. If the RLM measurement samples are influenced by the IDC interference in the phase 3, the unnecessary radio link failure can happen even though the quality of radio link during the scheduled period where LTE transmission/reception is performed is good. Thus, the UE needs to ensure that RLM measurement does not reflect the IDC interference also in the phase 3.

CQI measurement may also be influenced by the IDC interference. The purpose of the CQI measurement is to let the eNB know the downlink channel state so that the eNB configures an appropriate modulation and coding for the radio link. If the channel quality is estimated better that what it really is, the reception can be more vulnerable to the IDC interference.

Though there is a difference in severity of the IDC interference between the phase 1 and the phase 2, for a robust transmission with modulation and coding, it may be helpful to reflect the interference situation in the CQI measurement results in the phase 1 and the phase 2. If the measurements are limited only to non-influenced subframes, the UE may inform the eNB of biased CQI, and the network may select less robust modulation and coding so that the UE may fail to receive downlink data successfully due to the IDC interference.

In the phase 3, when TDM solution is applied to solve the IDC interference, since the LTE reception are performed only during a scheduling period where is free of the IDC interference, the CQI measurement needs to be free of the IDC interference for the eNB selecting appropriate modulation and coding for the LTE downlink. This restriction also applies to the measurement samples taken over an unscheduled period where the IDC interference exists, whereas data transmissions are performed only in the scheduling period. If the measured result taken during the unscheduled period reflects the IDC interference, the eNB may select unnecessarily more robust modulation and coding for reception during the scheduling period. This results deterioration of a cell throughput.

As described above, due to the IDC interference from other coexisting technology such as Wi-Fi, Bluetooth, RLM and CQI measurement results of the UE may be affected. For avoiding additional radio link problem and ensuring secure data transmission/reception, RLM and CQI needs to consider the IDC interference.

Accordingly, by considering the IDC interference, a method for performing RLM and/or CQI measurement based on phases according to IDC interference level according to embodiments of the present invention. That is, the behaviour of checking a radio link quality and channel quality (RLM, CQI) is depicted in each following phase. This phase is depicted from the UE point of view.

Phase 1: From the start of IDC interference detection to the delivery of the corresponding IDC indication to the network Phase 2: After successful transmitting the IDC indication to configuring TDM solution (e.g. DRX)

Phase 3: After configuring TDM solution

According to embodiments of the present invention, in the phase 1, the UE checks a radio quality for radio link/resource management, and reports a channel quality for data transmission over a connection between the UE and a network by measuring a cell without avoidance of IDC interference, before indicating the IDC interference to the network. In the phase 2, the UE checks the radio quality for radio link/resource management over the connection by measuring the cell with avoidance of IDC interference, after indicating the IDC interference to the network, but still reports the channel quality for the connection by measuring the cell without avoidance of IDC interference. In the phase 3, the UE reports the channel quality for the connection by measuring the cell with avoidance of the IDC interference, after receiving DRX configuration following the indication of the IDC interference.

That is, according to embodiments of the present invention, in the phase 1, RLM/CQI measurements reflect the IDC interference. In the phase 2, only RLM measurement does not reflect the IDC interference. In the phase 3, both RLM/CQI measurements do not reflect the IDC interference.

The IDC interference comes from ISM band, e.g. due to Wi-Fi, Bluetooth, GNSS, etc.

The UE may receive the DRX configuration from the network to apply the TDM solution. The UE may check the radio quality to detect whether or not a radio link over the connection fails and whether or not the UE needs to move to another cell.

Figure 10:
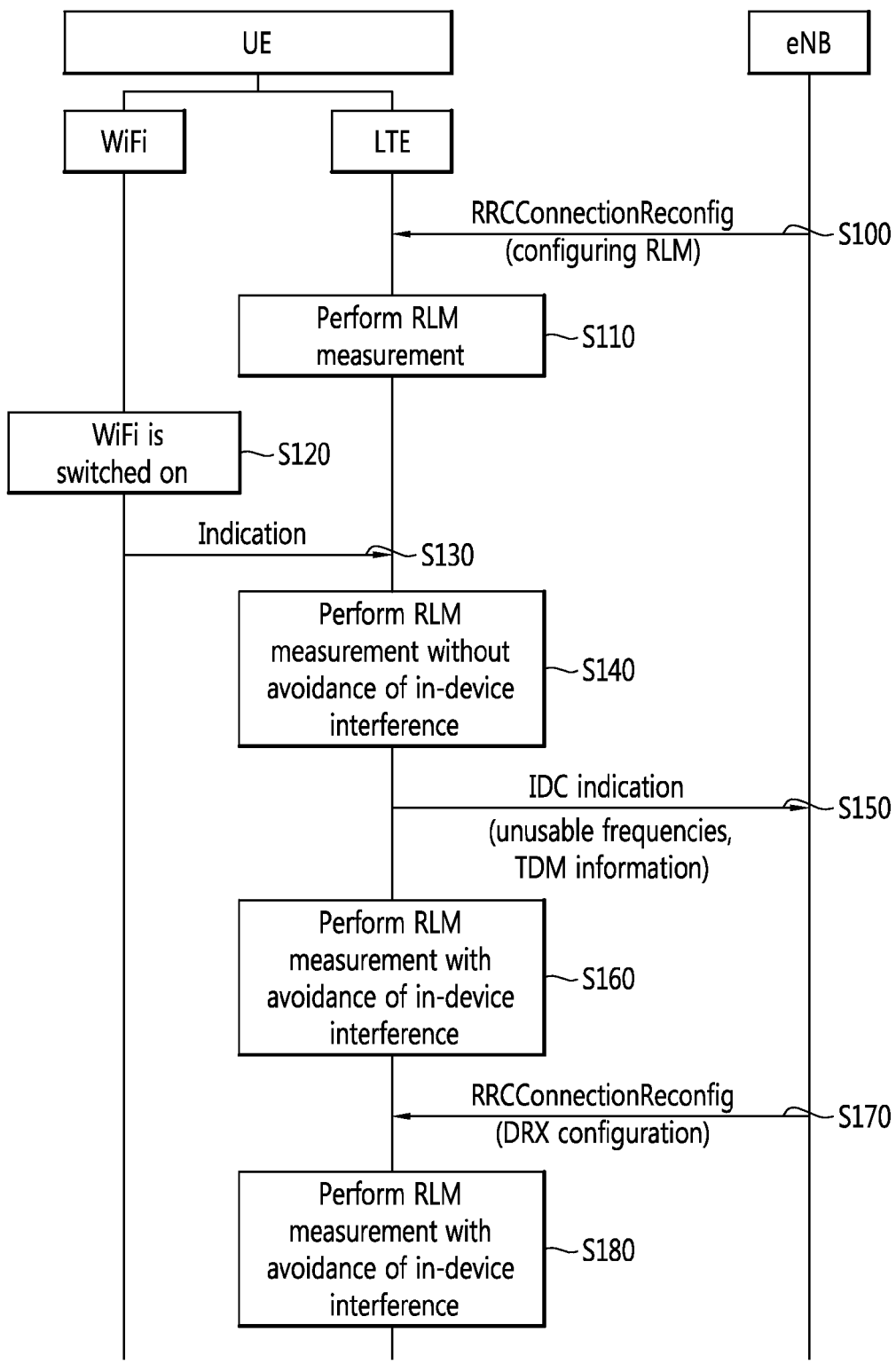
FIG. 10 shows an example of performing RLM measurement according to an embodiment of the present invention.

FIG. 10 shows an example of performing RLM measurement according to an embodiment of the present invention.

In FIG. 10, it is assumed that an LTE module and a Wi-Fi module coexist in the same UE. It is also assumed that when the Wi-Fi module is turned on, the LTE module may acknowledge that the Wi-Fi module is turned on through inter-coordination between the LTE module and the Wi-Fi module.

At step S100, the eNB configures RLM. The RLM may be configured via an RRC connection reconfiguration message.

At step S110, the LTE module in the UE performs RLM measurement in a legacy manner.

At step S120, the Wi-Fi module is switched on in order to transmit and/or receive data.

At step S130, through inter-coordination, the Wi-Fi module makes the LTE module know that the Wi-Fi module is turned on.

At step S140, during the phase 1, the UE performs the RLM measurement without avoidance of the IDC interference. The UE performs the RLM measurement at any subframes regardless of the IDC interference. In other words, the UE shall ensure that the RLM measurements reflect the IDC interference. If there is IDC interference at time and subframes where the RLM measurement is performed, the RLM measurement includes the results that are affected by the IDC interference.

When there is on-going IDC interference, at step S150, the UE transmits an IDC indication, including unusable frequencies due to the IDC interference and TDM assistant information, e.g. TDM patterns, to the eNB.

At step S160, during the phase 2, for maintaining the radio link connection until receiving solutions for the IDC interference, the UE performs the RLM measurement with avoidance of the IDC interference. In other words, the UE shall ensure that the RLM measurements are free of the IDC interference. If there is IDC interference at time and subframes where the RLM measurement is performed, the RLM measurement excludes the results that are affected by the IDC interference.

At step S170, the eNB configures a DRX, based on the TDM patterns provided by the UE, for resolving the IDC interference. The DRX may be configured via an RRC connection reconfiguration message.

At step S180, during the phase 3, for maintaining the radio link connection, regardless of scheduling period (period for LTE transmission/reception) and unscheduled period (period for ISM/GNSS transmission/reception), the UE performs the RLM measurement with avoidance of the IDC interference. In other words, the UE shall ensure that the RLM measurements are free of the IDC interference. If there is IDC interference at time and subframes where the RLM measurement is performed, the RLM measurement excludes the results that are affected by the IDC interference.

Figure 11:
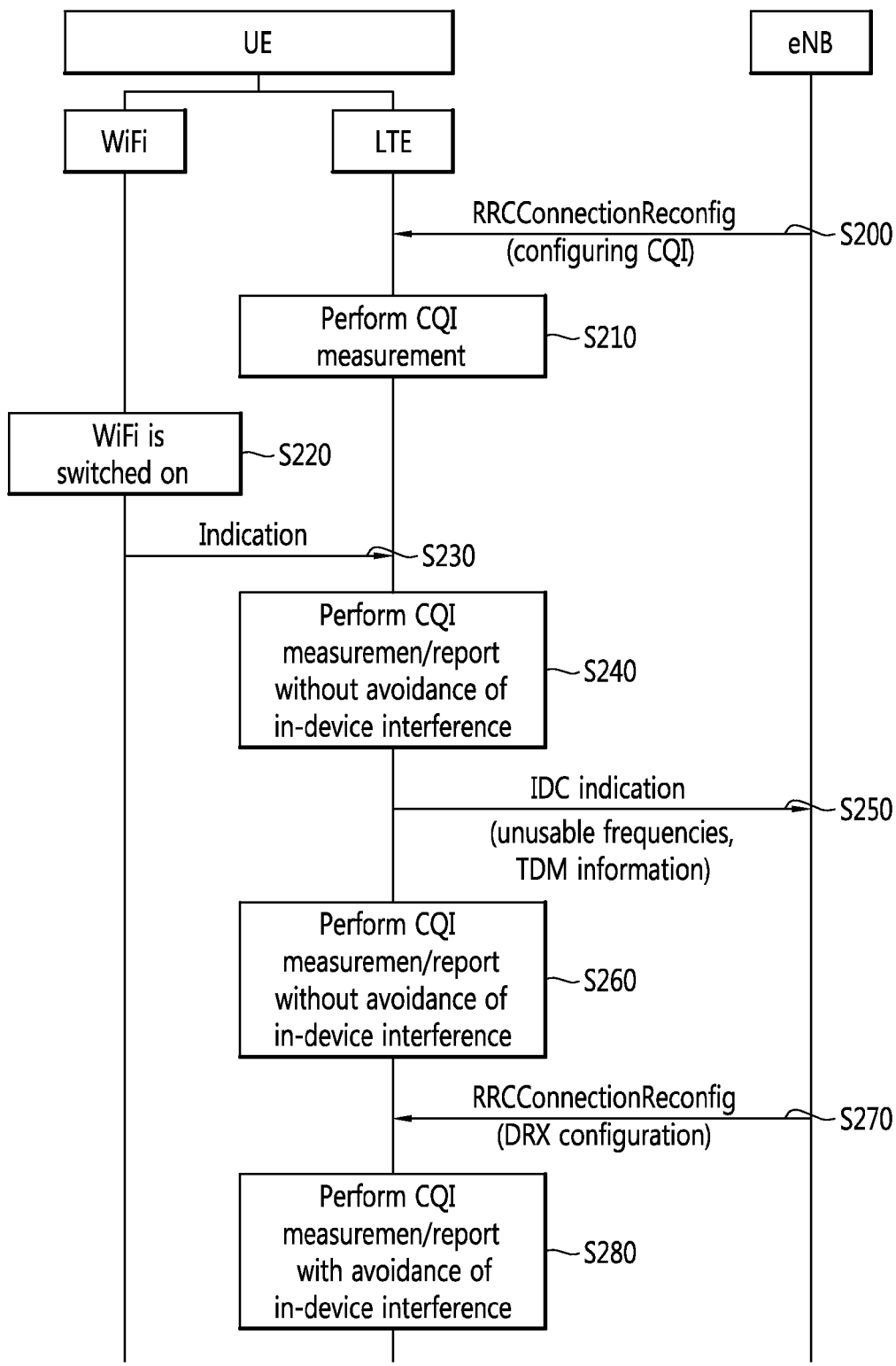
FIG. 11 shows an example of performing RLM measurement according to an embodiment of the present invention.

FIG. 11 shows an example of performing RLM measurement according to an embodiment of the present invention.

In FIG. 11, it is assumed that an LTE module and a Wi-Fi module coexist in the same UE. It is also assumed that when the Wi-Fi module is turned on, the LTE module may acknowledge that the Wi-Fi module is turned on through inter-coordination between the LTE module and the Wi-Fi module.

In FIG. 11, it is assumed that an LTE module and a Wi-Fi module coexist in the same UE. It is also assumed that when the Wi-Fi module is turned on, the LTE module may acknowledge that the Wi-Fi module is turned on through inter-coordination between the LTE module and the Wi-Fi module.

At step S200, the eNB configures a CQI. The CQI may be configured via an RRC connection reconfiguration message.

At step S210, the LTE module in the UE performs CQI measurement in a legacy manner.

At step S220, the Wi-Fi module is switched on in order to transmit and/or receive data.

At step S230, through inter-coordination, the Wi-Fi module makes the LTE module know that the Wi-Fi module is turned on.

At step S240, during the phase 1, the UE performs the CQI measurement without avoidance of the IDC interference. The UE performs the CQI measurement at any subframes regardless of the IDC interference. In other words, the UE shall ensure that the CQI measurements reflect the IDC interference. If there is IDC interference at time and subframes where the CQI measurement is performed, the CQI measurement includes the results that are affected by the IDC interference.

When there is on-going IDC interference, at step S250, the UE transmits an IDC indication, including unusable frequencies due to the IDC interference and TDM assistant information, e.g. TDM patterns, to the eNB.

At step S260, during the phase 2, securing the transmission/reception under the IDC interference, the UE performs the CQI measurement without avoidance of the IDC interference. In other words, the UE shall ensure that the CQI measurements reflect the IDC interference. If there is IDC interference at time and subframes where the CQI measurement is performed, the CQI measurement includes the results that are affected by the IDC interference.

At step S270, the eNB configures a DRX, based on the TDM patterns provided by the UE, for resolving the IDC interference. The DRX may be configured via an RRC connection reconfiguration message.

At step S280, during the phase 3, for maintaining the radio link connection, regardless of scheduling period (period for LTE transmission/reception) and unscheduled period (period for ISM/GNSS transmission/reception), the UE performs the CQI measurement with avoidance of the IDC interference. In other words, the UE shall ensure that the CQI measurements are free of the IDC interference. If there is IDC interference at time and subframes where the CQI measurement is performed, the CQI measurement excludes the results that are affected by the IDC interference.

In brief, RLM/CSI measurements in different phases of the IDC interference according to embodiments of the present invention may be represented by Table 6.

TABLE 6

| Phases of IDC Interference | RLM Measurements | CSI Measurements |
|---|---|---|
| Phase 1 | Up to UE implementation and RLM measurement requirements apply | Up to UE implementation and CSI measurement requirements apply |
| Phase 2 | UE shall ensure the measurements are free of IDC interference and RLM measurement requirements apply | UE shall ensure the measurements reflect IDC interference and CQI measurement requirements apply |
| Phase 3 | UE shall ensure the measurements are free of IDC interference and RLM measurement requirements apply | UE shall ensure the measurements are free of IDC interference and CQI measurement requirements apply |

According to embodiments of the present invention, a method for performing RLM/CQI measurement according to occurrence of the IDC interference and the progress of resolution of the IDC interference may be defined. Therefore, an unnecessary radio link failure may be prevented due to the IDC interference, and even though there is IDC interference, the UE may receive data from the eNB stably.

Figure 12:
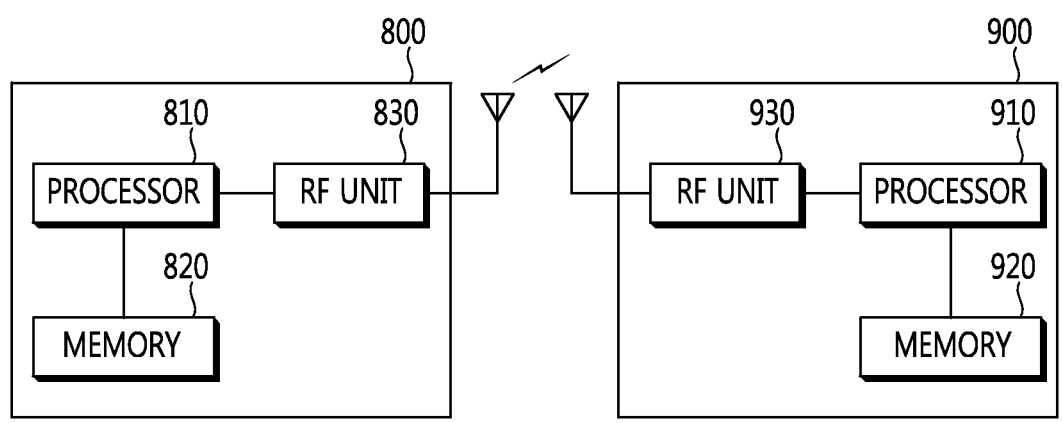
FIG. 12 is a block diagram showing wireless communication system to implement an embodiment of the present invention.

FIG. 12 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for measuring a channel in a wireless communication system, the method comprising:
   receiving, by a user equipment (UE), a first measurement configuration message from a network, wherein the first measurement configuration message includes configuration information for a radio link monitoring (RLM) measurement and a channel quality indicator (CQI) measurement;
   performing, by the UE, a first RLM measurement or a first CQI measurement based on the first measurement configuration;
   detecting, by the UE, an in-device coexistence (IDC) interference, wherein the IDC interference is detected when two different types of radio access technology (RAT) schemes are turned on;
   after detecting the IDC interference, performing, by the UE, a second RLM measurement or a second CQI measurement, based on the first measurement configuration, wherein the second RLM measurement or the second CQI measurement is performed without an avoidance of the IDC interference;
   transmitting, by the UE, an IDC indication to the network, wherein the IDC indication includes one or more unusable frequencies and one or more time division multiplexing (TDM) patterns causing the IDC interference;
   after transmitting the IDC indication, performing, by the UE, a third RLM measurement or a third CQI measurement, based on the first measurement configuration, wherein the third RLM measurement is performed with the avoidance of the IDC interference, and the third CQI measurement is performed without the avoidance of the IDC interference;
   receiving, by the UE, a second measurement configuration message from the network, wherein the second measurement configuration message includes one or more TDM patterns resolving the IDC interference;
   after receiving the second measurement configuration message, performing, by the UE, a fourth RLM measurement or a fourth CQI measurement, based on the second measurement configuration, wherein the fourth RLM measurement or the fourth CQI measurement is performed with the avoidance of the IDC interference.

2. The method of claim 1, wherein the third RLM measurement is performed excluding subframes affected by the IDC interference.

3. The method of claim 1, wherein the fourth RLM measurement is performed excluding subframes affected by the IDC interference.

4. The method of claim 1, wherein the one or more TDM patterns resolving the IDC interference indicate one or more discontinuous reception (DRX) patterns that resolve the IDC interference.

5. A terminal device for measuring a channel in a wireless communication system, the terminal device comprising:
   a radio communication transceiver for transmitting and receiving radio signals to and from an outside; and
   a control processor connected to the radio communication transceiver, and configured to:
   control the radio communication transceiver to receive a first measurement configuration message from a network, wherein the first measurement configuration message includes configuration information for a radio link monitoring (RLM) measurement and a channel quality indicator (CQI) measurement;
   perform a first RLM measurement or a first CQI measurement based on the first measurement configuration;
   detect an in-device coexistence (IDC) interference, wherein the IDC interference is detected when two different types of radio access technology (RAT) schemes are turned on within a user equipment, UE;
   after detecting the IDC interference, perform a second RLM measurement or a second CQI measurement, based on the first measurement configuration, wherein the second RLM measurement or the second CQI measurement is performed without an avoidance of the IDC interference;
   control the radio communication transceiver to transmit an IDC indication to the network, wherein the IDC indication includes one or more unusable frequencies and one or more time division multiplexing (TDM) patterns causing the IDC interference;
   after transmitting the IDC indication by the radio communication transceiver, perform a third RLM measurement or a third CQI measurement, based on the first measurement configuration, wherein the third RLM measurement is performed with the avoidance of the IDC interference, and the third CQI measurement is performed without the avoidance of the IDC interference;
   control the radio communication transceiver to receive a second measurement configuration message from the network, wherein the second measurement configuration message includes one or more TDM patterns resolving the IDC interference;
   after receiving the second measurement configuration message by the radio communication transceiver, perform a fourth RLM measurement or a fourth CQI measurement, based on the second measurement configuration, wherein the fourth RLM measurement or the fourth CQI measurement is performed with the avoidance of the IDC interference.

* * * * *